(12) United States Patent
Nowak et al.

(10) Patent No.: US 8,253,060 B2
(45) Date of Patent: Aug. 28, 2012

(54) HYBRID LASER ARC WELDING PROCESS AND APPARATUS

(75) Inventors: Daniel Anthony Nowak, Greenville, SC (US); Paul Stephen DiMascio, Greer, SC (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 12/826,800

(22) Filed: Jun. 30, 2010

(65) Prior Publication Data

US 2012/0000892 A1    Jan. 5, 2012

(51) Int. Cl.
*B23K 26/04* (2006.01)
(52) U.S. Cl. ......... 219/121.63; 219/121.64; 219/121.76; 219/136; 219/137 R
(58) Field of Classification Search ............. 219/121.63, 219/121.64, 121.76, 136, 137 R
See application file for complete search history.

(56) References Cited

U.S. PATENT DOCUMENTS

| 5,869,805 A | * | 2/1999 | Beyer et al. ............... 219/121.83 |
| 2002/0195432 A1 | * | 12/2002 | Sekiguchi ................ 219/121.64 |
| 2010/0243621 A1 | | 9/2010 | Nowak |

* cited by examiner

*Primary Examiner* — Minh-Loan T Tran
(74) *Attorney, Agent, or Firm* — Ernest G. Cusick; Gary M. Hartman; Domenica N. S. Hartman

(57) ABSTRACT

A welding method and apparatus for welding workpieces together by conducting a laser beam welding process on a joint region that includes a weld seam defined by and between faying surfaces of the workpieces, and then conducting a hybrid laser arc welding process on the joint region. The laser beam welding process entails causing a first laser beam to travel along the joint region, penetrate the weld seam and form a weldment. The hybrid laser arc welding process remelts the weldment by simultaneously causing an electric arc and a second laser beam to overlap and travel along the joint region and form a weld pool in the weldment. On cooling, a weld joint is formed within the joint region and its weld seam.

20 Claims, 1 Drawing Sheet

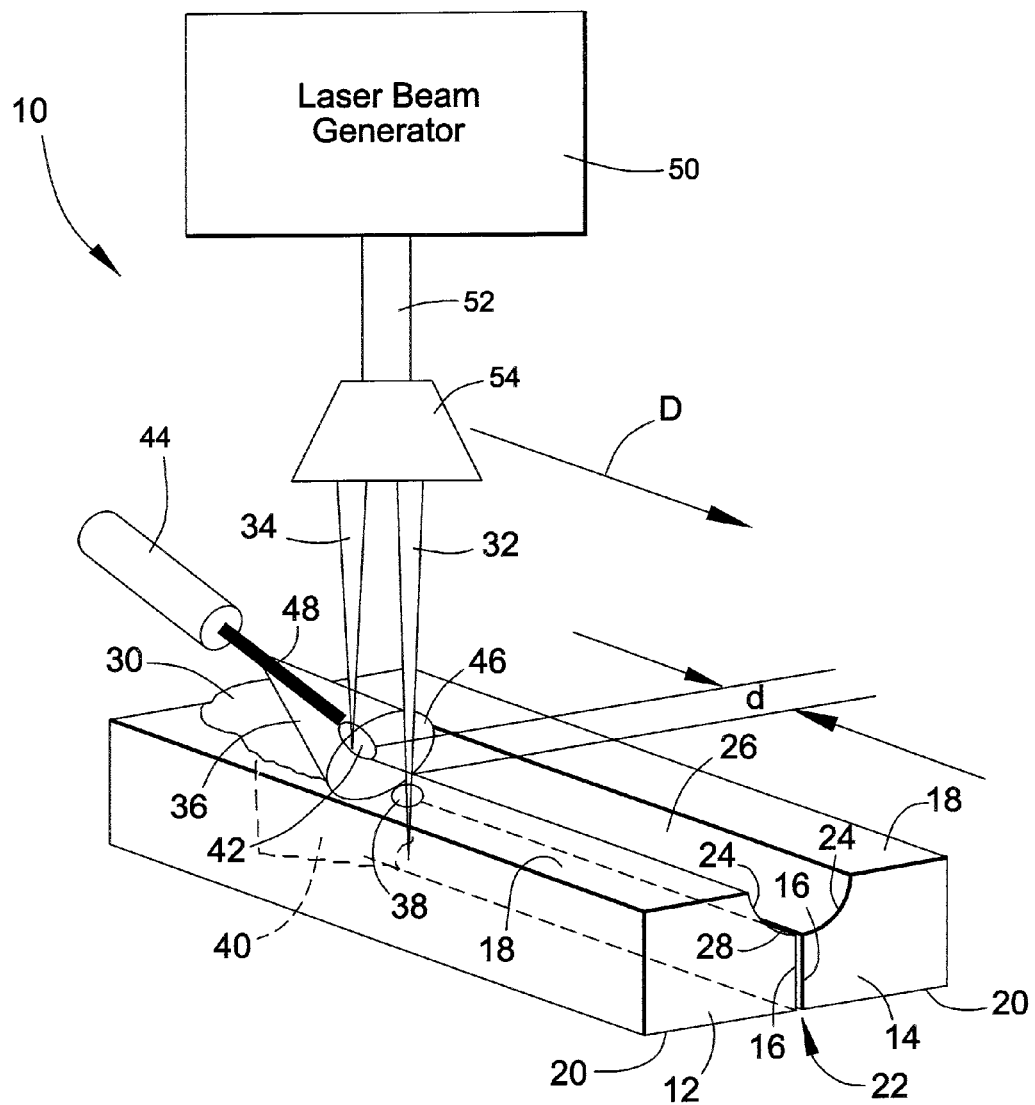

HYBRID LASER ARC WELDING PROCESS AND APPARATUS

BACKGROUND OF THE INVENTION

The present invention generally relates to welding methods. More particularly, this invention is directed to a welding process that utilizes a hybrid laser arc welding technique in which laser beam welding and arc welding simultaneously occur in the same weld pool, and further utilizes a second laser beam welding technique that precedes the hybrid laser arc welding technique to increase the weld depth and/or promote the elimination of porosity and gas pockets in the resulting weld joint.

Low-heat input welding processes, and particularly high-energy beam welding processes such as laser beam and electron beam welding (LBW and EBW, respectively) operated over a narrow range of welding conditions, have been successfully used to produce crack-free weld joints in a wide variety of materials, including but not limited to alloys used in turbomachinery. An advantage of high-energy beam welding processes is that the high energy density of the focused laser or electron beam is able to produce deep narrow welds of minimal weld metal volume, enabling the formation of structural butt welds that add little additional weight and cause less component distortion in comparison to other welding techniques, such as arc welding processes. Additional advantages particularly associated with laser beam welding include the ability to be performed without a vacuum chamber or radiation shield usually required for electron beam welding. Consequently, laser beam welding can be a lower cost and more productive welding process as compared to electron beam welding.

Though filler materials have been used for certain applications and welding conditions, laser beam and electron beam welding processes are typically performed autogenously (no additional filler metal added). The high-energy beam is focused on the surface to be welded, for example, an interface (weld seam) between two components to be welded. During welding, the surface is sufficiently heated to vaporize a portion of the metal, creating a cavity ("keyhole") that is subsequently filled by the molten material surrounding the cavity. A relatively recent breakthrough advancement in laser beam welding is the development of high-powered solid-state lasers, which as defined herein include power levels of greater than four kilowatts and especially ten kilowatts or more. Particular examples are solid-state lasers that use ytterbium oxide ($Yb_2O_3$) in disc form (Yb:YAG disc lasers) or as an internal coating in a fiber (Yb fiber lasers). These lasers are known to be capable of greatly increased efficiencies and power levels, for example, from approximately four kilowatts to over twenty kilowatts.

Hybrid laser arc welding (HLAW), also known as laser-hybrid welding, is a process that combines laser beam and arc welding techniques, such that both welding processes simultaneously occur in the same weld pool. The laser beam is typically oriented perpendicular to the surfaces to be welded, while the electric arc and filler metal of the arc welding process (for example, gas metal arc welding (GMAW, also known as metal inert gas (MIG) welding) or gas tungsten arc welding (GTAW, also known as tungsten inert gas (TIG) welding) are typically positioned behind and angled forward toward the focal point of the laser beam on the weld joint surfaces. This position of the arc welding process is known as a "forehand" technique. The benefit of the HLAW process is the ability to increase the depth of weld penetration and/or increase productivity by increasing the welding process travel speed, for example, by as much as four times faster than conventional arc welding processes.

Even though laser beam welding is known to have the various benefits noted above, deep penetrating laser beam welding techniques are known to be prone to trapped porosity. This propensity can be attributed to the low heat input associated with laser beam welding compared to typical fusion arc processes. As a result, the weld pool produced by laser beam welding tends to freeze very quickly, trapping gas-metal reaction products generated during the welding process. Though the inclusion of an arc process in HLAW processes helps to reduce porosity in shallow welds, for example, weld depths of less than one-half inch (about one centimeter), porosity resulting from trapped gas bubbles is an issue when attempting to achieve greater weld depths.

Reducing or eliminating porosity in deep laser welds would be particularly advantageous from the standpoint of achieving longer lives for components subjected to cyclic operations. One commercial example is the fabrication of wind turbine towers. Currently the use of welding processes that utilize a laser beam welding technique has been discouraged because of the propensity for large amounts of fine-sized internal porosity found in deep weldments produced by laser beam welding. The presence of porosity can significantly reduce the fatigue life of a weld joint and, therefore, a structure that contains the weld joint. Consequently, other welding techniques such as submerged arc welding (SAW) processes are more typically employed in the fabrication of structures subjected to cyclic operations, such as wind turbine towers. However, when used to weld large thick sections required in the construction of wind turbine towers, a significant drawback of the SAW process is low productivity, for example, resulting from the necessity to perform multiple passes at relatively low speeds, for example, about twenty to forty inches (about 50 to 100 cm) per minute. Though preheating the components just prior to welding might achieve a lower cooling rate to allow gas bubbles to escape the weld pool, in practice a component may require being heated to nearly three-quarters of its melting temperature, which is both expensive and can have deleterious effects on the base material properties of the component. Following laser beam welding with a second laser beam welding treatment to release the gas bubbles has also proven to be ineffective, since the weld pool produced by the second treatment also tends to freeze too quickly to allow gas bubbles to float free of the weld pool.

BRIEF DESCRIPTION OF THE INVENTION

The present invention provides a welding method and apparatus that utilize a hybrid laser arc welding process in combination with a laser beam welding process that precedes the hybrid laser arc welding process to increase the weld depth and/or promote the elimination of porosity and gas pockets in the final weld joint. The method is particularly well suited for welding relatively thick sections, for example, greater than one centimeter, that are otherwise difficult to weld using conventional hybrid laser arc welding techniques without resulting in excessive weldment porosity levels.

According to one aspect of the invention, the welding method involves placing workpieces together so that faying surfaces thereof face each other and a joint region is defined, the joint region comprising an intersurface portion defined by and between the faying surfaces. The workpieces are then welded together by performing a multistage welding process along the joint region. The multistage welding process comprises conducting a laser beam welding process on the joint region and then conducting a hybrid laser arc welding process on the joint region. The laser beam welding process comprises projecting a first laser beam onto the joint region and causing a projection of the first laser beam on the joint region to travel along the joint region, penetrate the intersurface portion of the joint region, and form a preliminary weldment in the joint region. The hybrid laser arc welding process is conducted along the joint region and remelts the preliminary weldment. The hybrid laser arc welding process comprises simultaneously causing an electric arc and a second laser beam to travel along the joint region while melting a filler material with the electric arc, wherein projections of the electric arc and the second laser beam on the joint region overlap to simultaneously form a weld pool in the preliminary weldment. The workpieces are then cooled to yield a welded assembly comprising a weld joint within the joint region and through the intersurface portion thereof.

According to another aspect of the invention, the welding apparatus includes means for welding the workpieces together by performing a multistage welding process along the joint region. The welding means comprises means for conducting a laser beam welding process on the joint region and means for conducting a hybrid laser arc welding process on the joint region. The laser beam welding process means is adapted to project a first laser beam onto the joint region and cause a projection of the first laser beam on the joint region to travel along the joint region, penetrate an intersurface portion of the joint region defined by and between the faying surfaces, and form a preliminary weldment in the joint region. The hybrid laser arc welding process means is adapted to conduct the hybrid laser arc welding process along the joint region and remelt the preliminary weldment to form a weld joint by simultaneously causing an electric arc and a second laser beam to travel along the joint region while melting a filler material with the electric arc and while overlapping projections of the electric arc and the second laser beam on the joint region to simultaneously form a weld pool in the preliminary weldment.

According to a preferred aspect of the invention, the pretreatment of a weld joint region with the first laser beam prior to performing a hybrid laser arc welding process enables the formation of relatively deep weld joints, for example, one centimeter and more, that contain little or no porosity attributable to entrapment of gas bubbles during the welding process. In so doing, advantages of laser beam welding become available for a variety of products, including but not limited to power generation, aerospace, infrastructure, medical, and industrial applications, an example of which is the construction of wind turbine towers.

Other aspects and advantages of this invention will be better appreciated from the following detailed description.

BRIEF DESCRIPTION OF THE DRAWINGS

FIG. 1 is a schematic representation of two workpieces abutted together and undergoing a multistage welding process in accordance with an embodiment of the present invention.

DETAILED DESCRIPTION OF THE INVENTION

FIG. 1 represents a welding apparatus 10 for conducting a multistage welding process that utilizes what may be a generally conventional hybrid laser arc welding process, but modified by the inclusion of a second laser beam that is projected onto the intended weld joint ahead of the hybrid laser arc welding process. The multistage welding process preferably yields a relatively deep-penetrating weldment that is capable of being free of porosity resulting from gas bubbles that evolve during laser beam welding. The welding process is particularly well suited for fabricating components that require welding at relative thick sections, for example, one centimeter or more, as is the case for fabricating various components used in power generation applications, including the construction of wind turbine towers, as well as components intended for a wide variety of other applications, including aerospace, infrastructure, medical, industrial applications, etc.

FIG. 1 represents a pair of workpieces 12 and 14 undergoing a multistage welding process of this invention. The workpieces 12 and 14 may be castings, wrought, or powder metallurgical form, and may be formed of a variety of materials, nonlimiting examples of which include nickel-based, iron-based alloys, cobalt-based, copper-based, aluminum-based, and titanium-based alloys. The workpieces 12 and 14 have faying surfaces 16 to be metallurgically joined by a weld joint 30. The faying surfaces 16 are contiguous with oppositely-disposed first and second surfaces 18 and 20 of the workpieces 12 and 14, between which the through-thickness of each workpiece 12 and 14 is defined.

In FIG. 1, the workpieces 12 and 14 are shown placed together so that their faying surfaces 16 face each other. A joint region 22 is identified as defined by the faying surfaces 16 as well as by immediately adjacent surface portions 24 of each workpiece surface 18. These surface portions 24 are juxtaposed as a result of the manner in which the workpieces 12 and 14 have been mated. FIG. 1 shows the surface portions 24 as being defined within a weld prep in the form of a groove 26 sized to accommodate filler metal deposited during the hybrid laser arc welding process, as discussed below. The weld prep groove 26 is represented as having a U-shaped cross-section, though other cross-sectional shapes are also within the scope of the invention. Furthermore, it is foreseeable that the weld prep groove 26 could be eliminated. FIG. 1 further shows a shim 28 placed between the faying surfaces 16 of the workpieces 12 and 14. The shim 28 can be utilized to provide fill metal for the weld joint 30, and/or provide additional benefits as described in U.S. patent application Ser. No. 12/415,305, namely, stabilizing the weld keyhole to reduce spattering and discontinuities during high-powered laser beam welding. For this purpose, the shim 28 is shown as larger than the faying surfaces 16 so that the upper edge of the shim 28 protrudes from between the workpieces 12 and 14. Suitable and preferred compositions for the shim 28 will depend on the compositions of the workpieces 12 and 14.

According to a particular aspect of the invention, the through-thickness of the joint region 22 (generally normal to the surface portions 24) can be one centimeter (about 0.5 inch) or more. Though such thicknesses have previously proven to be an impediment to the use of high-powered laser beams and conventional hybrid laser arc welding processes as a result of the former's propensity for gas entrapment and the latter's inability to avoid gas entrapment in deep weld joints, the present invention overcomes problems of the prior art through a combination of hybrid laser arc welding and laser beam welding that enables gases entrapped by the laser beam welding process to be released during the hybrid laser arc welding process that immediately follows the laser beam welding process.

In FIG. 1, the means for carrying out the laser beam welding process is represented as a first laser beam 32, which is shown as being projected onto the joint region 22 and shim 28 to define a projection 38 on the surface portions 24 of the joint region 22. The projection 38 is caused to travel in a direction "D" along the joint region 22. FIG. 1 represents the first laser beam 32 as penetrating essentially the entire weld seam, which is generally defined by an intersurface region of the joint region 22 between the faying surfaces 16. As such, the first laser beam 32 preferably penetrates essentially the entire through-thickness of the workpieces 12 and 14 and their joint region 22.

FIG. 1 represents the means for carrying out the hybrid laser arc welding process as comprising a second laser beam 34 and an electric arc 36. The second laser beam 34 is shown as being projected onto a weldment 40 formed by the first laser beam 32 and defining a projection 42 on the surface of the weldment 40, but not penetrating the through-thickness of the joint region 22. The electric arc 36 also travels to the weldment 40, defining a weld zone 46 on the surface of the weldment 40. As schematically represented in FIG. 1, the projected weld zone 46 of the arc 36 and the projection 42 of the second laser beam 34 overlap each other. More particularly, the weld zone 46 of the arc 36 is preferably larger than and completely surrounds the projection 42 of the beam 34. FIG. 1 further represents the arc 36 as emanating from an electrode, which is represented as a filler metal wire 48 fed into the arc 36 from a wire feed device 44, such as a spool. The weld zone 46 of the arc 36 and the projection 42 of the second laser beam 34 are both caused to simultaneously travel, preferably in unison, in the direction "D" along the joint region 22.

In view of the above, it can be appreciated that the arc welding process performed with the electric arc 36 is generally consistent with gas-shielded fusion arc processes, including but not limited to gas metal arc welding (GMAW, also known as metal inert gas (MIG) welding), gas tungsten arc welding (GTAW, also known as tungsten inert gas (TIG) welding), flux-cored arc welding (FCAW), and gas tungsten arc welding-hot wire (GTAW-HW). Various materials can be used for the filler metal wire 48, with preferred materials depending on the compositions of the workpieces 12 and 14 and the intended application. For example, a ductile filler may be preferred to reduce the tendency for cracking in the weld joint 30, or a filler may be used whose chemistry closely matches the base metal of the workpieces 12 and 14 to more nearly maintain the desired properties of the base metal. The wire 48 can have any suitable diameter, typical examples of which range from about 0.030 to about 0.062 inch (about 0.76 to about 1.6 mm). The wire 48 can be solid, cored with metal powder, or cored with both metal and an appropriate flux to provide a flux/slag reaction for cleaning the resulting weld pool.

The penetration depth of the weldment 40 and final weld joint 30 can be promoted by using at least one high-powered laser 50 as the source of one or both laser beams 32 and 34. Preferred high-powered lasers are believed to include solid-state lasers that use ytterbium oxide ($Yb_2O_3$) in disc form (Yb:YAG disc lasers) or as an internal coating in a fiber (Yb fiber lasers). Typical parameters for the high-powered laser welding process include a power level of greater than four kilowatts, for example, ten kilowatts or more, and a laser beam diameter of about 0.5 to about 1 millimeter (for example, at the projections 38 and 42). Other suitable operating parameters, such as pulsed or continuous mode of operation and travel speeds, can be ascertained without undue experimentation. Control of the laser 50 can be achieved with any suitable robotic machinery. The laser beam welding process can be performed in any suitable atmosphere, for example, an inert shielding gas, active shielding gas, or a combination thereof to form a mixed shielding gas. Consistent with laser beam welding processes and equipment known in the art, the laser beam welding process does not need to be performed in a vacuum or inert atmosphere.

In a preferred embodiment, a single high-powered laser 50 is used to generate a primary laser beam 52, which is then split by a prism 54 to create the first and second laser beams 32 and 34, align and space the beams 32 and 34 along the joint region 22, and orient the beams 32 and 34 to be parallel to each other and perpendicular to the surfaces 18 of the workpieces 12 and 14 and locally perpendicular to the surface portions 24 immediately adjacent the joint region 22. As described above, the second laser beam 34 is paired with the arc welding process to yield what can be a standard hybrid laser arc welding process, while the first laser beam 32 is projected ahead of the second laser beam 34 and directly on the joint region 22 to produce the weldment 40. The first laser beam 32 is preferably deep-penetrating and preheats the material immediately in front of the hybrid laser arc welding process. For this reason, the projections 38 and 42 of the laser beams 32 and 34 should be relatively closely spaced, for example less than one inch (about 2.5 cm) apart, for example, separated along the joint region 22 by a distance ("d" in FIG. 1) of about one-quarter to about three-quarters of an inch (about 0.5 to about 2 centimeters). In some situations, it may be preferable for the first laser beam 32 to be at a higher power level than the second laser beam 34, and/or to be more focused to have a smaller diameter than the second laser beam 34.

The first laser beam 32 forms a molten weld pool on the surface portions 24 of the joint region 22 and within the weld seam between the faying surfaces 16 that, consistent with laser welding techniques, cools relatively quickly and therefore has a tendency to entrap gasses generated by gas-metal reactions that evolve during welding. The entrapped gas bubbles result in the presence of porosity within the weldment 40. Though a serious limitation of prior art laser beam welding methods, the porosity and its entrapped gases can be largely if not completely eliminated by the hybrid laser arc welding process, which remelts at least the portion of the weldment 40 within the weld prep groove 26. Advantageously, the molten weld pool formed by the second laser beam 34 and electric arc 36 of the hybrid laser arc welding process solidifies more slowly than the molten weld pool formed by the first laser beam 32, which allows the gas bubbles to float out of the molten weld pool of the hybrid laser arc welding process to reduce and possibly eliminate porosity in the final weld joint 30.

In view of the above, preferred embodiments of the multi-stage welding process of this invention are able to at least partially eliminate the porosity that would otherwise result from the laser beam welding process performed by the first laser beam 32, while enabling the first laser beam 32 to provide several notable benefits. First, the laser beam 32 is preferably used to penetrate deeply into the weld seam of the joint region 22 which, in the absence of a weld deposit, enables the laser beam 32 to maximize the depth of the weldment 40 such that it may extend entirely through the weld seam. The laser beam 32 is also capable of providing a very high preheating temperature for the hybrid laser arc welding process that follows, promoting the penetration of the later process. In addition, the greater penetration of the hybrid laser arc welding process results in a slower cooling rate, which has the capability of reducing residual stresses in the weld joint 30.

Because the residual heat resulting from the first laser beam 32 and encountered by the hybrid laser arch welding process is dependent on the spacing (distance "d") between the laser beams 32 and 34 and the travel rates of the beams 32 and 34 along the joint region 22, splitting the primary laser beam 52 to form the two separate laser beams 32 and 34 is preferred in view of the difficulty of closely placing two parallel beams 32 and 34 with two separate laser beam generators. Though the first laser beam 32 could be angled back toward the second laser beam 34 to reduce their separation distance, doing so may interfere with the desired ability of the hybrid laser arc welding process to eliminate porosity from the weldment 40 produced by the laser beam welding process and its first laser beam 32.

In use, the welding apparatus 10 represented in FIG. 1 is operated to weld the workpieces 12 and 14 by projecting the first laser beam 32 onto the joint region 22 to melt the shim 28, penetrate the weld seam between the faying surfaces 16 of the workpieces 12 and 14, and create a molten pool that solidifies to form the weldment 40 in which porosity may be present. Subsequently, the weldment 40 is remelted by the second laser beam 34 and the electric arc 36 of the hybrid laser arc welding process, forming a second molten weld pool containing molten base metal from the weldment 40 as well as molten filler metal from the filler metal wire 48. Prior to solidification of this weld pool to form the weld joint 30, gas bubbles originally trapped within the weldment 40 preferably float upward through the weld pool and are released. On cooling, the workpieces 12 and 14 are metallurgically joined by the weld joint 30, which preferably extends entirely through the through-thickness of the resulting welded assembly. While the weld joint 30 depicted in FIG. 1 is a square groove butt joint, it should be understood that other joint types are foreseeable, including corner joints, lap joints, edge joints, and tee joints.

Reducing or eliminating porosity in the deep weld joint 30 promotes weld metal properties that are capable of achieving longer lives for components subjected to fatigue as a result of cyclic operating conditions. As previously noted, a commercial example is the fabrication of wind turbine towers used in power generation. Currently, certain wind turbine towers are fabricated with weld joints formed by submerged arc welding (SAW), requiring six to twelve welding passes at speeds of about twenty to forty inches per minute (about 50 to 100 cm/minute). With the present invention, it is believed that equivalent and potentially superior weld joints can be produced in a single pass at speeds of about 100 to 200 inches per minute (about 2500 to 5000 cm/minute). Prior to the present invention, laser beam welding of such structures would have been discouraged because of significant amounts of fine internal porosity formed when attempting to laser beam weld sections with thicknesses greater than about one-half inch (about one centimeter).

While the invention has been described in terms of a preferred embodiment, it is apparent that other forms could be adopted by one skilled in the art. Accordingly, the scope of the invention is to be limited only by the following claims.

The invention claimed is:

1. A method of welding at least two workpieces together by metallurgically joining faying surfaces of the workpieces, the method comprising:
    placing the workpieces together so that the faying surfaces thereof face each other and a joint region is defined, the joint region comprising an intersurface portion defined by and between the faying surfaces;
    welding the workpieces together by performing a multistage welding process along the joint region, the multistage welding process comprising conducting a laser beam welding process on the joint region and then conducting a hybrid laser arc welding process on the joint region, the laser beam welding process comprising projecting a first laser beam onto the joint region and causing a projection of the first laser beam on the joint region to travel along the joint region, penetrate the intersurface portion of the joint region, and form a preliminary weldment in the joint region, the hybrid laser arc welding process being conducted along the joint region and remelting the preliminary weldment, the hybrid laser arc welding process comprising simultaneously causing an electric arc and a second laser beam to travel along the joint region while melting a filler material with the electric arc, wherein projections of the second laser beam and the electric arc on the joint region overlap to simultaneously form a weld pool in the preliminary weldment; and then
    cooling the workpieces to yield a welded assembly comprising a weld joint within the joint region and through the intersurface portion thereof.

2. The method according to claim 1, wherein the first and second laser beams are created by splitting a primary laser beam.

3. The method according to claim 2, wherein the primary laser beam is at a power level of at least four kilowatts.

4. The method according to claim 1, wherein the first laser beam is at a power level greater than the second laser beam.

5. The method according to claim 1, wherein the second laser beam is at a power level greater than the first laser beam.

6. The method according to claim 1, wherein the first and second laser beams are separated along the joint region by a distance of less than 2.5 centimeters.

7. The method according to claim 1, wherein the first and second laser beams are separated along the joint region by a distance of about 0.5 to about 2 centimeters.

8. The method according to claim 1, wherein the first and second laser beams are parallel to each other.

9. The method according to claim 1, wherein the first and second laser beams are perpendicular to a surface portion of the joint region defined by surfaces of the workpieces adjoining the faying surfaces that remain exposed after the workpieces are placed together.

10. The method according to claim 1, wherein the projection of the first laser beam on the joint region has a diameter less than a diameter of the projection of the second laser beam on the joint region.

11. The method according to claim 1, wherein the preliminary weldment formed by the laser beam welding process solidifies more rapidly that the weld joint formed by the hybrid laser arc welding process.

12. The method according to claim 1, further comprising placing a shim between the workpieces so that the faying surfaces contact the shim and the shim is within the intersurface portion of the joint region.

13. The method according to claim 12, wherein the shim is melted by the laser beam welding process of the multistage welding process.

14. The method according to claim 1, wherein the intersurface portion and the weld joint extend at least one centimeter beneath a surface portion of the joint region defined by first surfaces of the workpieces adjoining the faying surfaces that remain exposed after the workpieces are placed together.

15. The method according to claim 1, wherein the electric arc is generated by a gas-shielded fusion arc welding process.

16. The method according to claim 1, wherein the preliminary weldment solidifies and entraps gas bubbles therein, and gases within the bubbles are released from the preliminary weldment as a result of the hybrid laser arc welding process remelting the preliminary weldment.

17. The method according to claim 1, wherein the welded assembly is a power generation, aerospace, infrastructure, medical, or industrial component.

18. The method according to claim 1, wherein the welded assembly is a component of a wind turbine tower.

19. An apparatus for welding at least two workpieces together by metallurgically joining faying surfaces thereof that face each other to define a joint region, the apparatus comprising:
- means for welding the workpieces together by performing a multistage welding process along the joint region, the welding means comprising means for conducting a laser beam welding process on the joint region and means for conducting a hybrid laser arc welding process on the joint region;
- the laser beam welding process means being adapted to project a first laser beam onto the joint region and cause a projection of the first laser beam on the joint region to travel along the joint region, penetrate an intersurface portion of the joint region defined by and between the faying surfaces, and form a preliminary weldment in the joint region; and
- the hybrid laser arc welding process means being adapted to conduct the hybrid laser arc welding process along the joint region and remelt the preliminary weldment to form a weld joint by simultaneously causing an electric arc and a second laser beam to travel along the joint region while melting a filler material with the electric arc and while overlapping projections of the second laser beam and the electric arc on the joint region to simultaneously form a weld pool in the preliminary weldment.

20. The apparatus according to claim 19, wherein the first and second laser beams are created by means for splitting a primary laser beam, the splitting means causing the first and second laser beams to be perpendicular to a surface portion of the joint region.

* * * * *